US005297501A

United States Patent [19]

Lieberman et al.

[11] Patent Number: 5,297,501

[45] Date of Patent: Mar. 29, 1994

[54] INTENSE NOISE GENERATOR

[75] Inventors: Paul Lieberman, Torrance; Ronald W. Bocksruker, Los Angeles, Calif.

[73] Assignee: National Technical Systems, Calabasas, Calif.

[21] Appl. No.: 997,358

[22] Filed: Dec. 28, 1992

[51] Int. Cl.[5] ........................ B06B 1/00; G01N 29/00

[52] U.S. Cl. .................................. 116/137 A; 73/571

[58] Field of Search ...... 116/137 R, 137 A, DIG. 18; 181/142, 213, 217, 221; 73/571, 577, 584, 642

[56] References Cited

U.S. PATENT DOCUMENTS

| | | | |
|---|---|---|---|
| 2,864,455 | 12/1958 | Hirschorn | 181/217 |
| 3,169,507 | 2/1965 | Rich | 116/127 A |
| 3,169,509 | 2/1965 | Rich | 116/137 A |
| 3,195,678 | 7/1965 | Morgan et al. | 181/221 |
| 3,198,007 | 8/1965 | Overton | 73/571 |
| 3,230,923 | 1/1966 | Hughes | 116/137 A |
| 3,458,008 | 7/1969 | Benham | 181/217 |
| 3,721,521 | 3/1973 | Schmidlin | 116/127 A |
| 4,574,632 | 3/1986 | Woolley et al. | 73/571 |

FOREIGN PATENT DOCUMENTS 0251919 11/1947 Switzerland .................... 116/137 A

OTHER PUBLICATIONS

Physical Review, vol. XX, Second Series, Dec., 1922, pp. 719-727 Julius Hartmann, "New Method for Generation of Sound Waves".

*Primary Examiner*—William A. Cuchlinski, Jr.
*Assistant Examiner*—John L. Beres
*Attorney, Agent, or Firm*—Marvin H. Kleinberg

[57] ABSTRACT

A noise generator is created by having a high pressure gas applied to a Mach 2 nozzle which is combined in an adjustable nozzle assembly with a resonance tube of adjustable length with a closed end forming a Mach disk between them. The resultant compression and expansion shock wave oscillations exit the resonance tube and are propagated between reflecting domes which direct the generated noise around a test article in a housing which contains the generated noise. A muffler includes a water spray chamber and baffled bulkheads to dissipate the generated noise.

13 Claims, 7 Drawing Sheets

INTENSE NOISE GENERATOR

FIELD OF INVENTION

This invention relates to an apparatus for generating pressure waves, and, more specifically, to an improved apparatus utilizing the flow of gases through a nozzle into a resonance tube for the generation of intense random noise which can be used to simulate the noise created by large,

PRIOR ART

In the past, noise generators have been used since the advent of jet engine technology for the testing of components which are used in the environment of an operating jet engine. Prior generators of this type, however, have serious design and operational limitations in that they fail to meet current testing requirements needed for recently developed rocket motors capable of creating millions of pounds of thrust or other components of modern advanced high speed aircraft.

One of the earliest of such shock wave generators was developed by J. Hartmann. [See "On the Production of Acoustic Waves by Means of an Air Jet of a Velocity Exceeding that of Sound," Phil Mag. (7) 11, pp 926–948, 1931; and "Hartmann Acoustic Generator," Engineering 142, p 491, (1936)]. This well-known gas-operated sonic generator, commonly referred to as the "Hartmann" generator, uses pressurized air (at pressures up to 100 psi) to create a gas jet which is diverted into a cavity resonator to create a sonic output pressure wave in the surrounding air. The Hartmann generator has serious drawbacks as a source of sonic energy in that it is inefficient. It has now been determined that much if its inadequacy arose from its operation at relatively low input gas pressures.

U.S. Pat. No. 3,903,988, issued Sep. 9, 1975, to R. W. Hermsen et al, discloses a rocket noise generator having a circular groove machined around the circumference of the inside surface of the supersonic portion of the rocket nozzle which generates a loud "screech" at a single frequency. The circular groove causes the local boundary layer to thicken, forming a normal shock wave across the entire flow cross-section.

The Hermsen et al device uses a combination of boundary layer and normal shock wave that is very unstable and oscillates rapidly. The rapid oscillation acts like a diaphragm that emits a strong acoustic signal downstream toward the nozzle exit. This is a disadvantage because the resulting oscillation is at a single frequency which fails to simulate the real, broad spectrum acoustic environment produced by current high thrust rocket motors and advanced high speed aircraft. Such disadvantages limit the ability of the Hermsen et al device to test adequately the structural integrity of component parts that comprise these rocket motors and high speed aircraft.

The relatively complex mechanical design of the shock wave generator disclosed in U.S. Pat. No. 3,416,628, issued Dec. 17, 1968, to O. Bschorr et al is undesirable in that this design requires many moving parts, resulting in higher maintenance requirements and unprofitable downtime. Although the Bschorr et al patent discloses a shock wave generator that is capable of producing simulated random jet noise, a further disadvantage of the Bschorr et al device is that this jet noise is restricted to a limited frequency range.

The sonic pressure wave generator disclosed in U.S. Pat. No. 3,230,923, issued Jan. 25, 1966, to N. Hughes represents an improvement over the Hartmann type generator. This design, however, has limitations in that the acoustic power delivered is limited to selected frequencies. Further, the relatively low input pressures utilized result in converging and diverging conical compression waves which attach to the exit plane of the nozzle. In view of the present invention, it is believed that a higher input pressure would have permitted the formation of a normal shock disk, and its more powerful emission of acoustic noise.

U.S. Pat. No. 3,230,924, to N. Hughes, also issued Jan. 25, 1966 and the related Hughes U.S. Pat. No. 3,232,267, issued Feb. 1, 1966, disclose slight improvements, in that a cleaner tone, increased acoustic power and improved single frequency performance result. However, these designs have disadvantages similar to those associated with related U.S. Pat. No. 3,230,923.

The sonic generator disclosed in U.S. Pat. No. 3,214,846, which issued Nov. 2, 1965, to R. S. Soloff, is limited to a single brief frequency of the order of 10,000 Hertz. The Soloff sonic generator, however, requires a complete rebuilding in order to produce a substantial change in the sound frequencies generated. Such rebuilding is impractical, costly and would result again in only a single sound frequency.

An additional disadvantage of the Soloff sonic generator is that much of the random acoustic energy produced is discarded as waste energy. This waste energy results in operational inefficiencies and a limited emulation of real acoustic environments which are produced by high thrust rocket motors and advanced high speed aircraft.

BRIEF SUMMARY OF THE INVENTION

According to the present invention, a high pressure gas source (180–800 p.s.i.g.) is coupled into a MACH 2 nozzle in an adjustable nozzle assembly. The exit jet is initially a strongly diverging and underexpanded jet that creates a Mach disk just downstream of the nozzle exit plane at the convergence of the incident barrel shock and reflected barrel shock boundaries. A resonance tube of adjustable length with a closed end is placed downstream from the Mach disk location and is of sufficient diameter to receive the entire output of the nozzle.

The supersonic gas from the jet nozzle enters the resonance tube creating a compressed gas region in the tube with a stationary shock wave at the resonance tube leading edge and also drives a shock wave down the resonance tube. As the propagating shock wave impinges on the closed end of the resonance tube, the pressure increases dramatically, and the shock wave is reflected. The reflected shock wave propagates back upstream in the resonance tube with the gas therein highly compressed. The compressed gas is dumped into the atmosphere via an expansion wave.

The expansion wave is formed by reflection of a compression shock wave reflection from the open mouth of the resonance tube. The expansion wave then propagates down the resonance tube and reflects from the closed end of the tube as a stronger expansion wave which propagates upstream at a relatively low pressure toward the open end of the resonance tube.

The effect of this four step cycle is to dump pressurized gas radially outward and inward periodically from the open end of the resonance tube, thereby generating noise. The noise from the resonance tube has a frequency associated with the four step process wherein compression shock waves and expansion waves make their way back and forth and back and forth in one cycle.

Operating with source gas pressures in the 800 p.s.i.g. range, the Mach disk created by the nozzle has a diameter somewhat greater than the nozzle exit and allows a resonance tube diameter of approximately the same size to receive substantially all of the high velocity gas exiting the nozzle.

This configuration sets up two different shock disk configurations at different times in its periodic operation. In the first period, a "normal" static shock disk forms at the mouth of the resonance tube. In the second period, a "conical" moving shock shape is formed which moves to a point between the Mach disk and the static, normal standing shock disk. During the first period, the high speed, low pressure gas from the nozzle passes directly through the Mach and shock disks and compresses to a very high pressure that is fed into the resonance tube without spilling the driver jet gas around the mouth of the tube.

In the second period, gas exiting the resonance tube as well as gas flowing from the nozzle is deflected radially away from the mouth of the resonance tube. The timing between the two configurations is controlled by the length of the resonance tube and the pressure oscillations emitted from the mouth of the resonance tube. In addition, during either of the configurations, the shock wave structure, itself, oscillates and emits a random noise frequency component. The change of shock configurations and the oscillation of the shock configurations generate combined harmonic and random acoustic noise in a conical pattern approximately 45° from the nozzle axis.

The frequency of the cycle is associated with the wave front speed divided by four times the length of the resonance tube. The wave front speed is slightly higher than the acoustic speed.

The resultant noise or acoustic energy that is created travels in a substantially conical solid angle about the nozzle axis and is directed to an outer dome where it is reflected against a coaxial inner dome which thereafter directs the noise into a test area that is defined by an exterior housing. The outer dome and inner dome create a circumferential annular area in which the items to be tested are mounted and on to which the noise is directed.

The 45° cone of acoustic noise propagates through the confinement of the outer ellipsoidal dome and the inner ellipsoidal dome. The wave front of the acoustic noise thereby expands in frontal area as a function of distance. The relationship of this increased area as a function of distance for these two ellipsoidal confining domes, is exponential. This exponential relation is ideal for impedance matching the acoustic noise source to the test section annulus with minimum acoustic losses due to undesirable standing waves and can be accomplished in a very short distance.

The shell of the test fixture represents the outer wall of the annulus and the test element is the inner wall. The noise wave propagates in a direction that is parallel to the test element surface. The domes have an axial orifice through which the expansion nozzle and resonance tube extend.

The acoustic energy thereby generated passes the end of the test article and then enters a muffler in which the acoustic energy is damped and absorbed by a combination of a fine mist water spray which dissipates some of the high and low energies and muffler apertures.

In one configuration, a small diameter pin of finite length extends through the throat of the supersonic nozzle and is centered along the center line. The pin blocks and eliminates the center or core portion of the gas flow which portion contributes very little to the sound generating mechanism. The annular flow around the pin oscillates radially inward and outward in the space between the nozzle exit plane and the mouth of the resonator tube, thereby stabilizing the oscillatory resonant frequencies in the solid angle that is forward and close to the system centerline. The pin base leaves a momentum deficit at the centerline so that the radial flow in and out is encouraged.

In alternative embodiments, prior art noise generators may be added to the system to enhance the noise at particular frequencies. Also, simulated test devices are provided so that expensive components which must be tested are not tied up while the test equipment is being aligned and calibrated for a particular test. Especially since the size and shape of the domes and the length of the resonant tube are determined by the size and shape of the part to be tested.

OBJECTS AND ADVANTAGES

Accordingly, it is an object of our invention to provide a noise generator that utilizes an oscillating supersonic shock phenomenon to produce a wide frequency range of random acoustic energy including pressure levels extending far into the ultrasonic regime and which energy closely simulates the acoustic environment produced by high thrust rocket motors and advanced high speed aircraft.

It is a further object of invention to provide a noise generator that utilizes no moving parts.

It is yet an additional object of invention to provide a noise generator capable of performing accurate acoustic fatigue tests on large structural and test section panels.

It is another object of invention to provide a noise generator that produces a sound pressure level spectrum that is flat between low frequencies (speed of sound divided by four times the length of a resonance tube) and frequencies of up to at least 80,000 cycles per second.

It is a further object of invention to provide a noise generator wherein the use of a relatively long resonance tube extends the low frequency cut-off frequency down to the very low end of the acoustic range while the flat sound pressure level spectrum into the ultrasonic regime is preserved.

It is yet an additional object of invention to provide a noise generator with a muffler utilizing a water spray that acts as an efficient absorbent termination impedance.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF DRAWINGS

Figure 1:
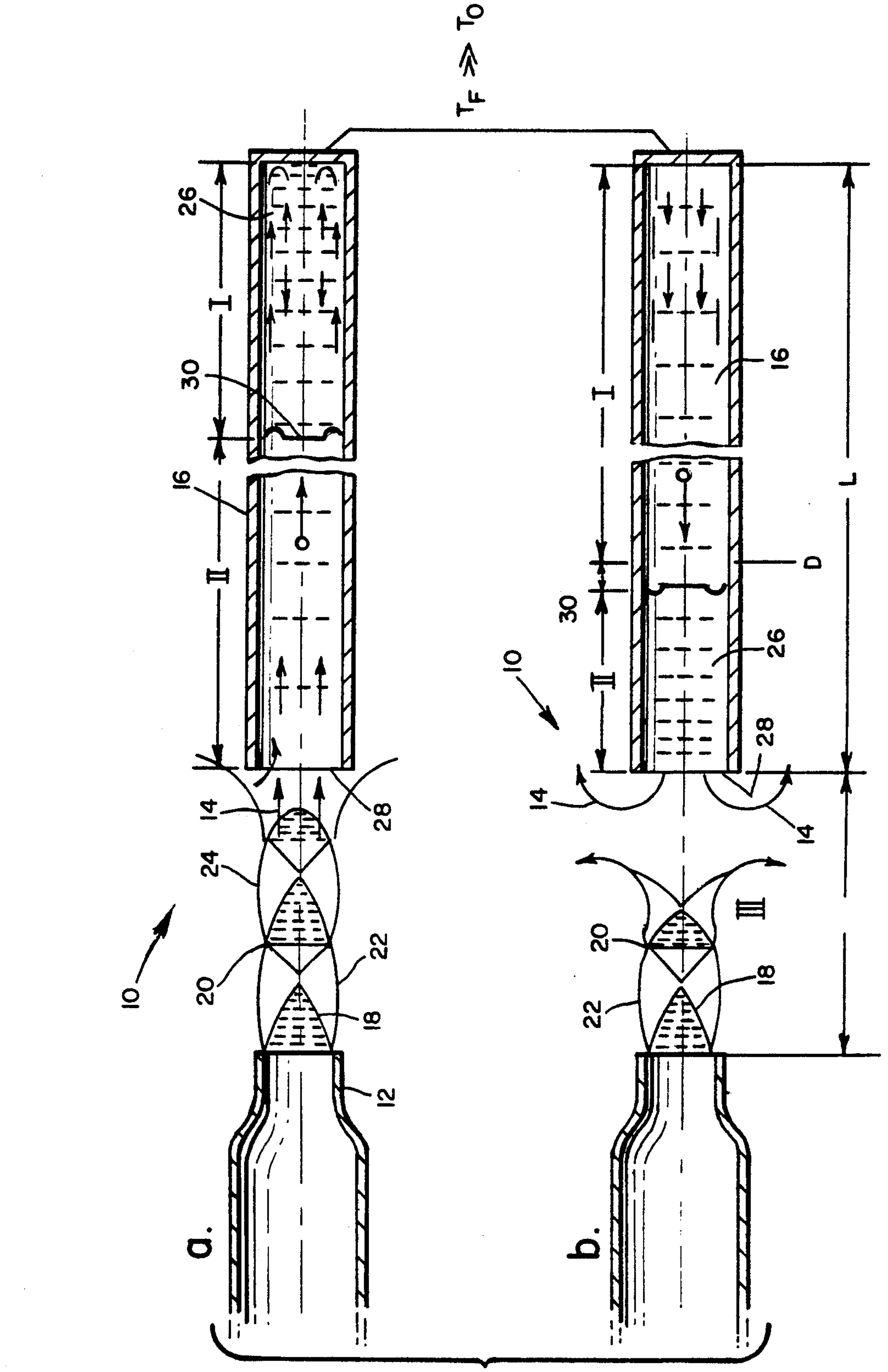
FIG. 1, including FIGS. IA and IB is an idealized sectional view of a noise generator according to the present invention with FIG. 1A showing high velocity gas entering a resonance tube with FIG. 1B showing high velocity gas exiting the resonance tube.
Figure 2:
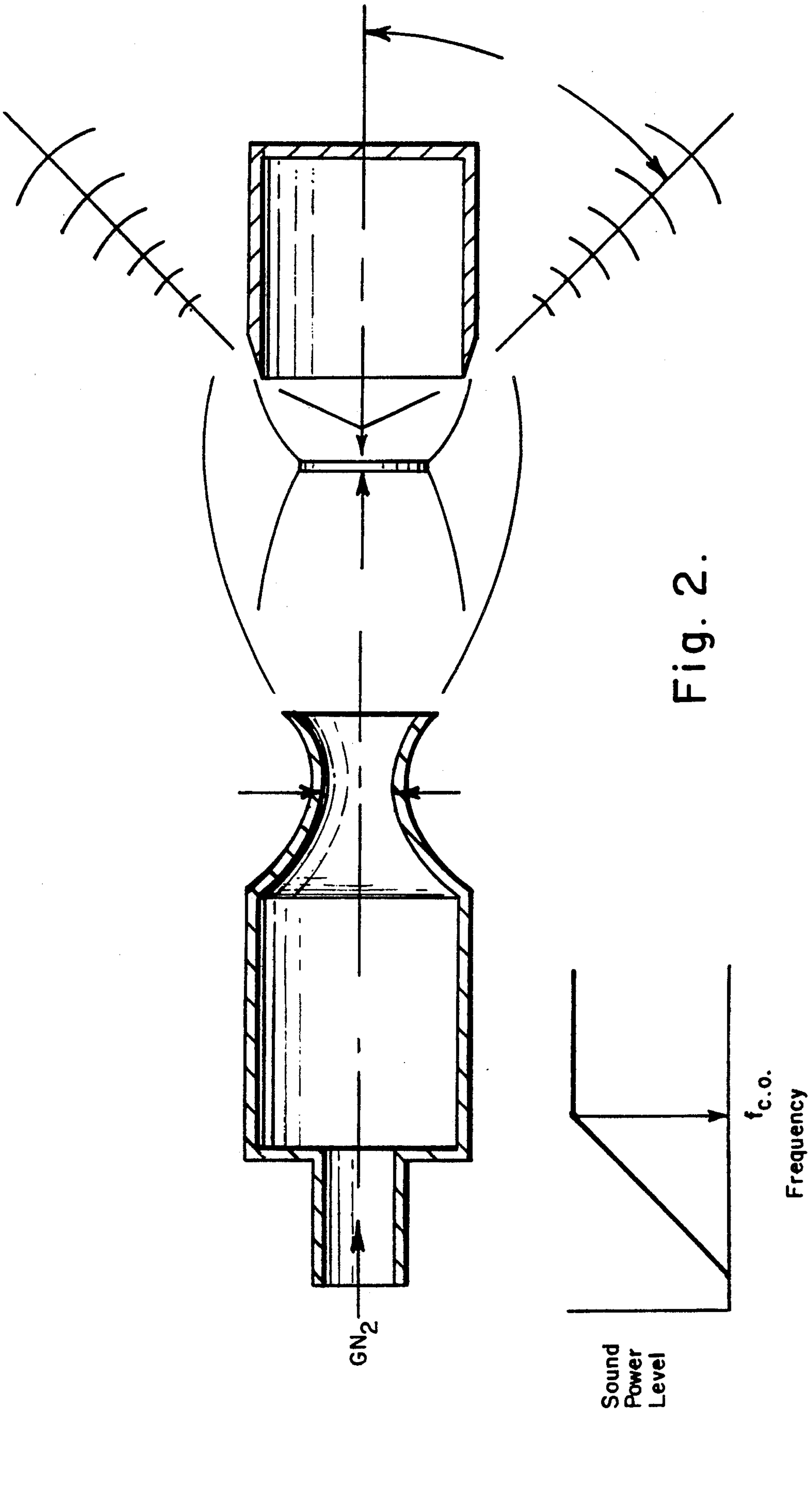
FIG. 2 is an enlarged idealized sectional view of a noise generator better showing the sources of acoustical noise.

Turning first to FIG. 1, there is shown a noise generator 10 according to the present invention with FIG. 1A showing a nozzle 12 from which flows a gaseous fluid, in this case a gas 14 at a high velocity. The gas 14 enters a resonance tube 16 in FIG. 1A, and in FIG. 1B, exits the resonance tube 16. The jet emerging from the nozzle 12 is initially an extremely high velocity jet 18 that creates a Mach disk 20 just downstream of the nozzle exit plane at the convergence of the incident barrel shock boundary 22 and the reflected barrel shock boundary 24. The resonance tube 16 has an adjustable length and a closed end and is placed downstream from the Mach disk 20 location and is of sufficient diameter to receive the entire output of the nozzle 12.

The supersonic gas 14 from the jet nozzle 12 enters the resonance tube 16 creating a compressed gas region 26 in the tube with a stationary standing normal shock wave 28 at the resonance tube leading edge and also drives a moving normal shock wave 30 down the resonance tube 16. As the moving shock wave 30 propagates to and impinges on the closed end of the resonance tube 16, the pressure increases dramatically, and the moving shock wave 30 is reflected. The reflected shock wave 30 propagates back upstream in the resonance tube 16 with the gas therein highly compressed. The compressed gas is dumped into the atmosphere via an expansion wave 32.

The expansion wave 32 is formed by reflection of a compression shock wave reflection from the open mouth of the resonance tube 16. The expansion wave 32 then propagates down the resonance tube 16 and reflects from the closed end of the tube as a stronger expansion wave which propagates upstream at a relatively low pressure toward the open end of the resonance tube.

The effect of this four step cycle is to dump pressurized gas radially outward and inward periodically from the open end of the resonance tube 16, thereby generating noise. The noise from the resonance tube has a frequency associated with the four step process wherein compression shock waves and expansion waves make their way back and forth and back and forth in one cycle.

Figure 3:
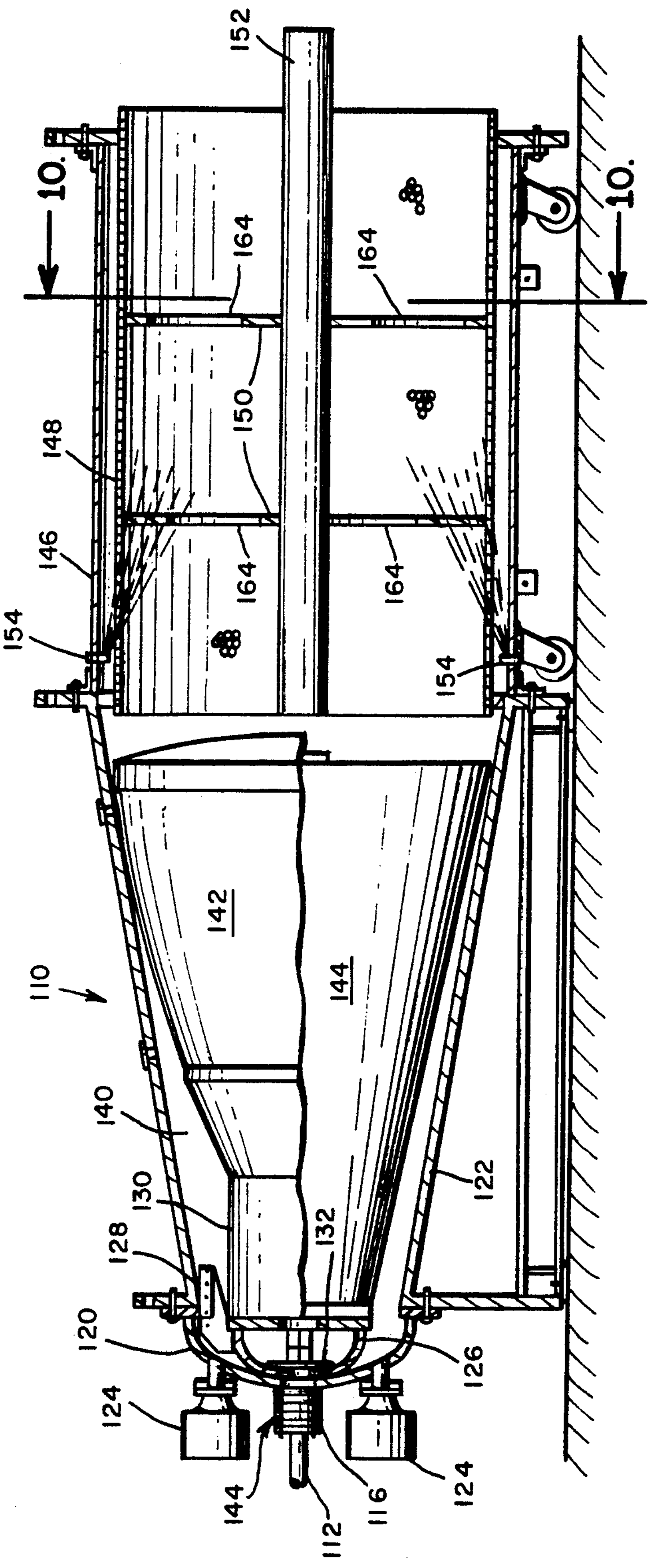
FIG. 3 is an overall plan view of a preferred embodiment of a noise generator and test assembly shown in full from an inlet end to an exhaust end according to the present invention.

A typical embodiment of the noise generator of the present invention is illustrated in FIG. 3. The noise generator 110 receives highly pressurized nitrogen, typically at approximately 650 p.s.i.g. at a gas inlet 112. Gas inlet 112 is connected to a nozzle assembly 114 shown in a sectioned view in FIG. 4.

The nozzle assembly 114 is comprised of a plurality of adjusting spacers 116 and a Mach 2 nozzle 118 arranged colinearly with the gas inlet 112. The nozzle assembly 114 is secured by mounting means to an outer dome 120. Outer dome 120 is, in turn, secured by mounting means to a conically shaped outer housing 122.

A pair of modulators 124 are connected to the outer dome 120 positioned both above and below the nozzle assembly 114. Typical modulators 124 are commercially available from Team Corporation of South El Monte, Calif. under the designation "MARK VI". An inner dome 126 which is coaxial with the outer dome 120 is supported from the housing 122 by a plurality of mounting ears 128. The inner dome 126 is sized so that its circumference approximates that of the article to be tested in the chamber. The environment that receives the sound is defined by the outer surface of the inner dome 126 and the inner surface of the outer dome 120, initially, and in the test area proper by the inner surface of the housing and the outer surface of the article to be tested.

Figure 4:
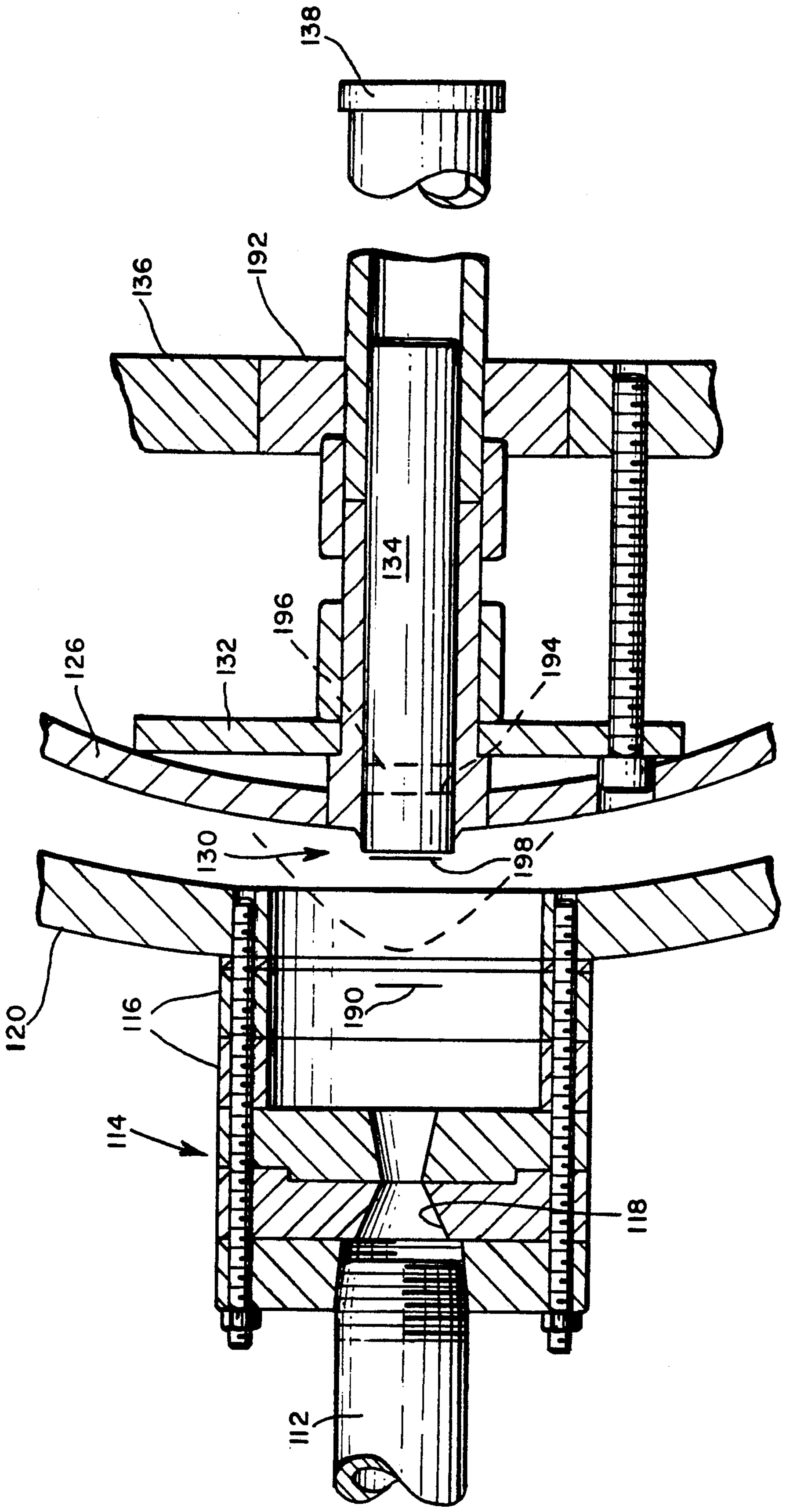
FIG. 4 is a sectional view in detail of the noise generator portion of the assembly of FIG. 3.
Figure 6:
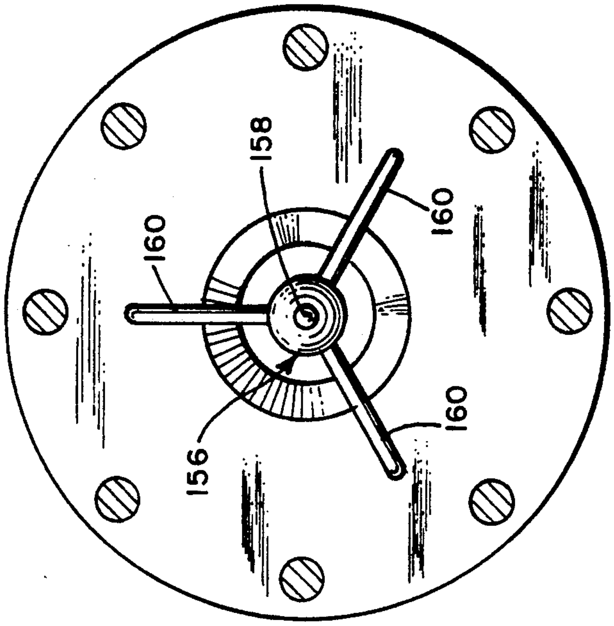
FIG. 6 is a cross-sectional view in detail of the assembly of FIG. 5 taken along the line 6—6 of FIG. 5 in the direction of the appended arrows.

A resonance tube assembly 130 is connected through the center of the concave side of inner dome 126. As seen in FIG. 4, resonance tube assembly 130 is supported by an inner dome plate 132. Connected to resonance tube assembly 130 is a resonance tube 134 which is of a length that is determined by a desired resonant lower frequency. The resonance tube 134 extends through a mounting face plate 136 and terminates with a capped end 138.

The test zone area 140 is defined by the interior space of housing 122. As shown in FIG. 3 a test article 142 (in the upper half) or a simulated test article 144 (in the lower half) provide the inner boundary of the test zone area 140. Either the test article 142 or the simulated test article 144, alternatively, is secured to housing 122 by the mounting face plate 136. A muffler housing 146 is connected to the housing 122 and includes a muffler 148, a plurality of muffler bulkheads 150, a muffler pipe 152 and a plurality of water spray nozzles 154.

Figure 5:
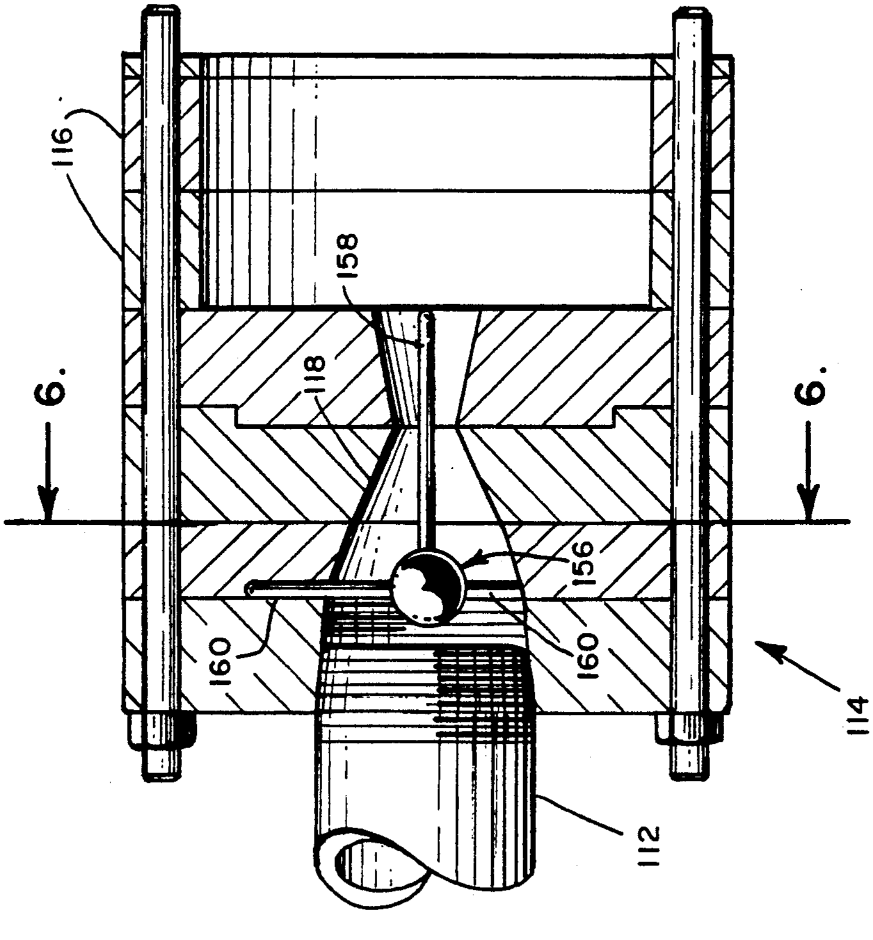
FIG. 5 is an enlarged side view showing an alternative configuration of the noise generator of FIG. 4.

As shown in FIGS. 5, a preferred embodiment of the gas nozzle 118 includes a central pin subassembly 156 comprised of a center pin 158 and a plurality of radial pins 160. The central pin subassembly 156 is secured within nozzle 118 by the radial pins 160.

Figure 10:
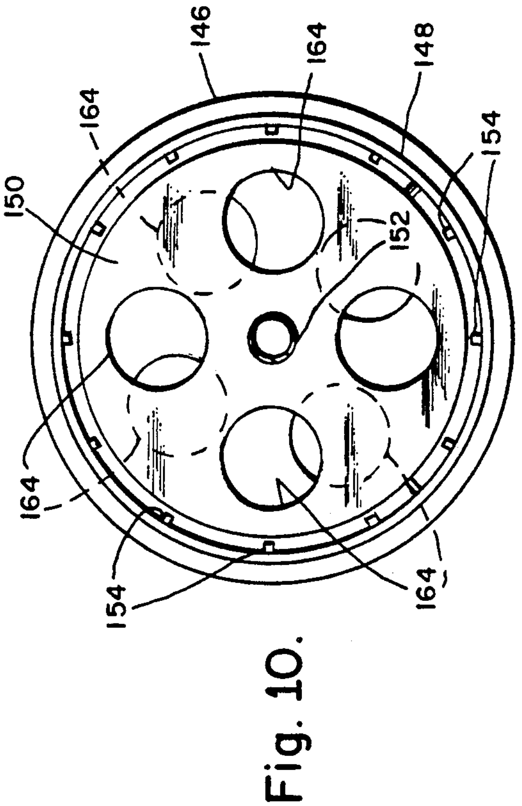
FIG. 10 is an end view of the muffler portion of FIG. 3, taken along the line 10—10 in the direction of the appended arrows.

The acoustic energy passes the end of test article 142 or simulated test article 144 then enters the muffler 148 which is contained and supported by the muffler housing 146. Within the muffler 148 there are muffler bulkheads 150 which have apertures 164. FIG. 10 illustrates the bulkheads from an end view. The muffler water spray nozzles 154 add moisture which assists in dissipating the acoustic energies generated. The mass of the water droplets and the subsequent reduction of the vibrating air velocity absorbs some of the energy, and the tortuous path created by the bulkhead apertures 164 further dissipates the energy.

OPERATION OF INVENTION

Operation of the noise generator 110 of the present invention begins with the introduction of a highly pressurized gas such as nitrogen into gas inlet 112. Preferably, the pressure of the gas approximates 650 p.s.i.g. and ranges from 120 p.s.i.g. to 1,000 p.s.i.g. As a practical matter, pressures higher than 800 p.s.i.g. may necessitate extraordinarily large storage tanks to permit a test of reasonably long duration.

The high pressure nitrogen gas enters nozzle assembly 114 and is exhausted through the Mach 2 nozzle 118. At the 800 p.s.i.g. pressure nitrogen operation, it may be necessary to increase the Mach number of the nozzle 118 and to have a greater stand-off distance to the mouth of the resonance tube 134. Moreover, the mouth of the resonance tube 134 may have a greater diameter than the exit of the nozzle 118 since the Mach disk that is formed increases in diameter with the velocity of the gas resulting from such pressures.

Central pin subassembly 156 functions to control the boundary conditions of the now supersonic gas jet as it exits the nozzle 118 such that no shock wave results proximate to the nozzle 18. A Mach disk 190 is created intermediate the nozzle 118 and the resonance tube 134.

Supersonic gas from nozzle 118 enters the resonance tube 134 creating a compressed gas region in resonance tube 134 that has a shock wave 192 at its leading edge as it enters the open end of the tube 134. As noted above, the resonance tube assembly 130 supports the resonance tube 134 and further structural support is provided by inner dome plate 132 and the resonance tube aperture 152.

As the shock wave 192 enters the resonance tube 134, a four step repeating cycle is begun. First, the shock wave 192 propagates from the open end of resonance tube 134 toward capped end 138. The shock wave 192 impinges on capped end 138 and its pressure increases dramatically. Second, the wave 192 reflects from capped end 138 and propagates back upstream in the resonance tube 134 with the gas therein highly compressed. As the compression shock wave 192 reaches the open end of the resonance tube 134, it engages a contact surface 194. Third, the compressed gas is dumped into the atmosphere as an expansion wave 196 propagates down the resonance tube 134 toward the capped end 138, wherein the contained gas is now at a pressure above atmospheric pressure. Finally, the expansion wave 196 reflects from capped end 138 as a stronger expansion wave and propagates at a relatively low pressure toward the open end of resonance tube 134 to engage the contact surface 194 and reflect as a compression wave 192.

The effect of this four step cycle is create a moving conical shock disk 198 which periodically dumps pressurized gas from nozzle 118 and the open end of resonance tube 134 into the test zone 140 of the test chamber thereby generating noise.

The noise from the resonance tube 134 has a low frequency associated with the four step process wherein shock waves and expansion waves make their way back and forth in one cycle. A 6 foot resonance tube, for example, would have a fundamental frequency of 47 Hertz if the average speed of travel of the pressure fronts is 1,128 feet per second. This calculation enables the determination of the fundamental mode frequency of any given resonance tube.

In a series of tests of the present invention, the sound pressure level exhibited a flat spectrum for all frequencies up to 50,000 Hertz. At frequencies less than the fundamental mode frequency, however, there was little energy emitted. The noise level was particularly high, reaching approximately 150 dB per one-third octave over the entire frequency range at a distance of one foot from the open end of resonance tube 134.

Operational and testing adjustments are made by varying the length of resonance tube 134 and by utilization of adjusting spacers 116. The resultant noise or acoustic energy that exits from the open end of resonance tube 134 is reflected from outer dome 120 and thereafter directed by inner dome 126 into test area 140. This noise or acoustic energy is contained by housing 122. Housing 122 can also function to support the test article 142 or the simulated test article 144 by means of mounting face plate 136 and mounting 10 ears, not shown.

Figure 7:
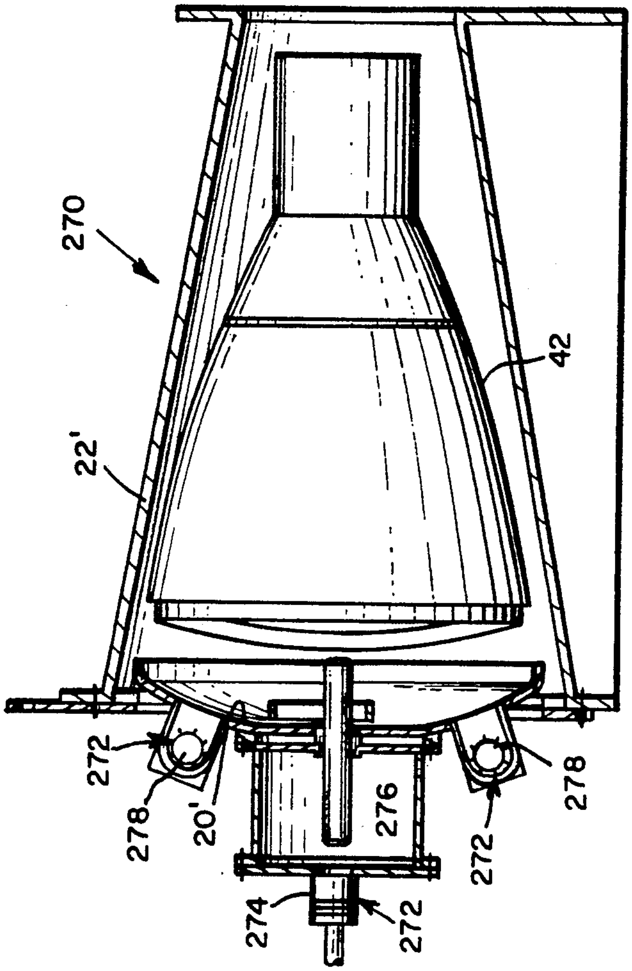
FIG. 7 is a side section view of an alternate embodiment utilizing five noise generators according to the present invention.
Figure 8:
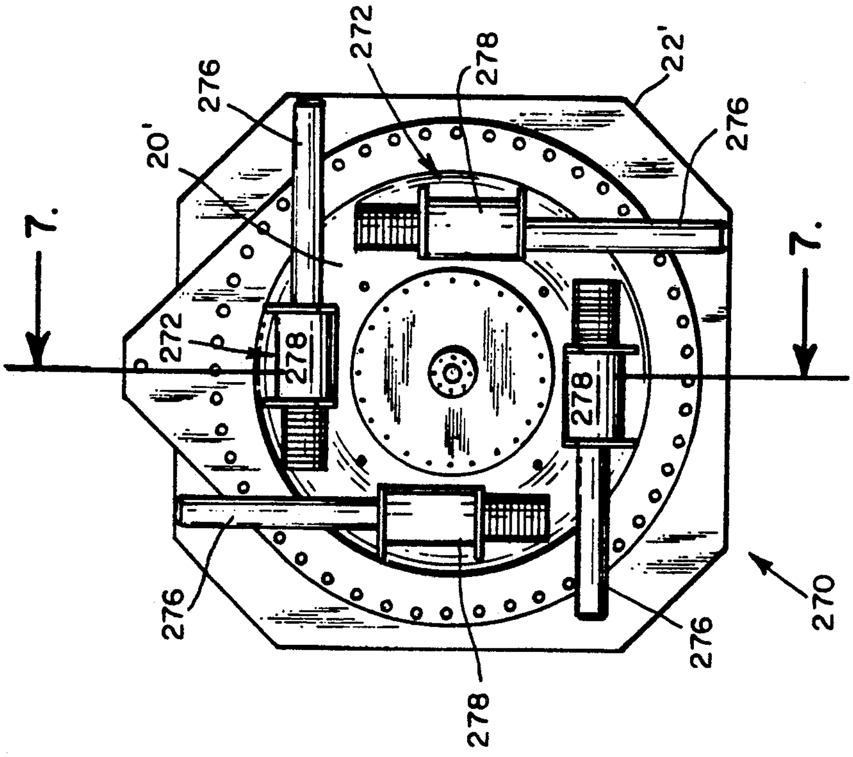
FIG. 8 is an end view of the apparatus of FIG. 7.
Figure 9:
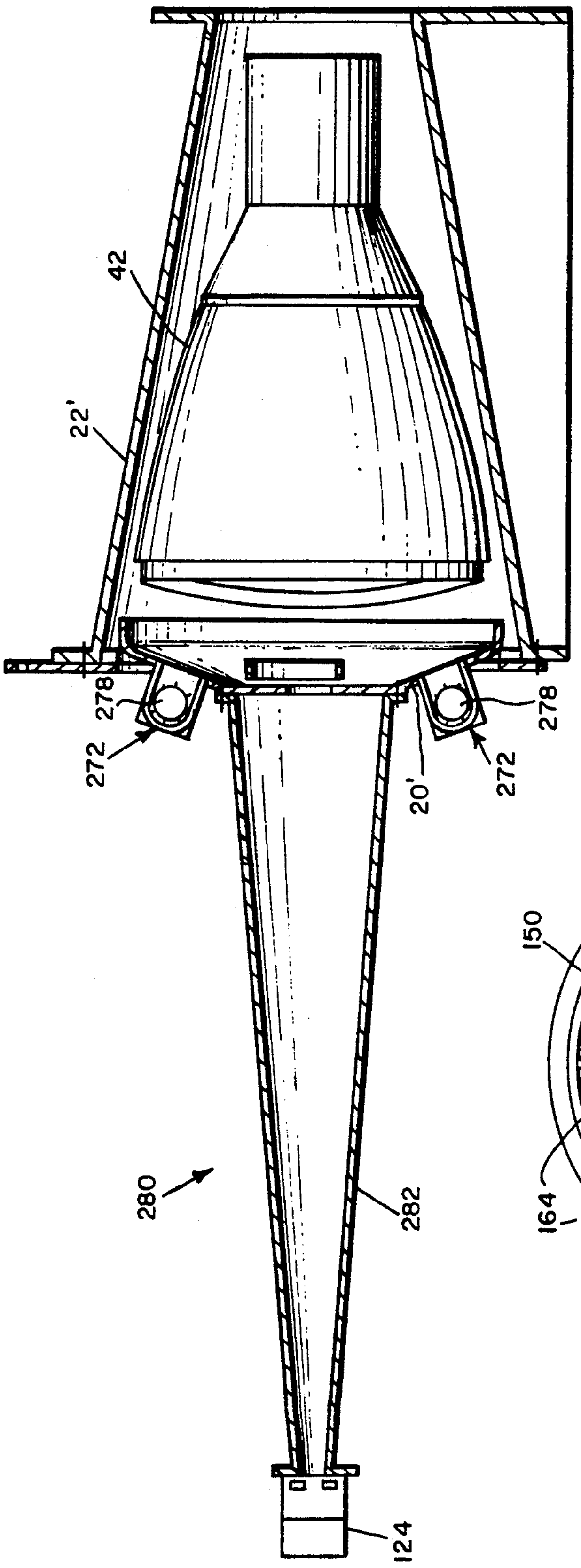
FIG. 9 is a side section view of another alternate embodiment according to the present invention.

FIGS. 7-9 show alternate embodiments of the noise generator of the present invention. These embodiments incorporate all of the features of the invention described herein and will be readily understood by one skilled in the art. FIGS. 7 and 8 show a noise generator 270 according to the present invention modified by the addition of a plurality of side mounted MACH 2 nozzle assemblies 272 to the nozzle assembly 110 of FIG. 3 to create the desired acoustic environment. The assemblies 272 are aligned in a plane that is orthogonal to the central axis of the test apparatus.

Each of the nozzle assemblies 272 operates with an individual resonance tube 276 to create alternating shock and expansion waves. The noise waves spread radially outward from the axis of the nozzle assembly 272. A portion of the wave is unobstructed and enters the chamber which contains the object to be tested. The portion of the noise wave which would otherwise radiate away from the object is redirected by the housing of the nozzle and is reflected into the chamber, as well.

Some of the noise pattern is directed to the interior of the test fixture between the outer and inner domes 20, 26, respectively. The noise energy which would otherwise be directed away from the interior is reflected by a cylindrical nozzle housing 278 into the interior.

A centrally mounted nozzle assembly 114 with its associated resonance tube assembly 130 adds its contribution which propagates into the test chamber.

FIG. 9 shows a second alternate embodiment of the present invention wherein a low frequency horn 282 is used in combination with four side mounted nozzle assemblies 272 and two modulators 124 such as the Team Corporation MARK VI modulators, to create the desired acoustic environment. In place of the centrally mounted nozzle assembly 214 of FIG. 7, above, the low frequency horn 282 is fitted with the two modulators 124.

In this alternative embodiment, the low frequency portion of the sound pressure level spectrum in the region between 20 and 500 Hertz is supplemented by the addition of the two modulators 124, as are utilized in the embodiment of FIG. 3.

The desired acoustical environment and noise distribution pattern is completed by the use of outer dome 20′ and inner dome 26′ which cooperate together to create the noise channeling geometry required to direct the generated noise energy around either a test article 42 or a simulated test article 44 as shown in FIG. 3. The dimensions of the inner dome 26' are dependent upon the dimensions of the article to be tested in any particular situation. It is necessary that the noise energy be channeled so that it impinges on the surfaces to be challenged, which, in the case of rocket motors, for example, would be the exterior. However, the modified inner dome 26 of FIG. 7 can be employed in this embodiment, as well.

These alternate embodiments of the noise generator of the present invention operate in a similar manner to the preferred embodiment of the present invention. These two embodiments, however, have a different physical arrangement in that they direct the flow of acoustic energy to a test article with a different envelope. It is noted that in the preferred embodiment, the substantially conical test article shown was oriented so that the smaller end was adjacent the noise generator. In the alternative embodiments, the test article is arranged so that the larger end is adjacent the noise generator.

By providing the additional physical arrangement of the noise generator, test performance data taken from operation of all of the embodiments can be combined, thus giving more complete, effective and reliable test performance data.

SUMMARY

Accordingly, the overall design of the acoustic system of the present invention incorporates a unique combination of various established aspects of gas dynamics. This unique combination and the optimization of the described component parts has permitted the creation of an acoustic test facility capable of generating very high intensity sound pressure levels that remain intense far into the ultrasonic region.

The resulting acoustic environment is ideal for testing the structural integrity of large, symmetrical test articles from recently developed high speed aircraft and high thrust rocket motors such as the Titan IV rocket motor and nozzle. Furthermore, the acoustic system of the noise generator of the present invention has the additional advantages in that:

(a) the radiated noise from the oscillating Mach disk created at the nozzle exhaust as well as the noise from the oscillating moving shock disk is enhanced;

(b) the radiated noise from the oscillating shock wave in the resonance tube is enhanced;

(c) the pressure of the gas applied to the nozzle can be increased to increase the diameter of the Mach disk which permits an increase in the diameter of the resonance tube. These larger source dimensions project a given strong noise field to greater distances;

(d) the sound pressure level spectrum becomes flat between the low frequency cut-off frequency to at least 80,000 Hertz;

(e) the use of a relatively long resonance tube extends the low frequency cut-off frequency down to the low frequency limit of the acoustic range. A 10 foot resonance tube, for example, corresponds to a low frequency cut-off frequency of 28 Hertz. The flat sound pressure level spectrum into the ultrasonic region, however, is preserved;

(f) the intense portion of the directional noise field radiated from the noise generator of the present invention is a solid cone angle that extends from the nozzle axis at about 45 degrees;

(g) the noise field in the annular space between the outer and inner domes propagates with wave fronts that are approximately normal to the confining surfaces between the enclosing domes and the annular area between the test chamber housing and the articles to be tested. The cross sectional area as a function of propagation distance is an exponentially increasing function of distance. This phenomenon permits the efficient area impedance matching of source to the connecting test section;

(h) the axial movement of a conical test article within a stationary conical test housing permits the annular free space to be an increasing or decreasing function of distance along the length of the test article. This permits the overall sound pressure level to be modified as a function of distance along the test article. Thus, if a constant overall sound pressure level is required to be applied all along a test article covered with a sound deadening material, the annular area will be configured to be decreasing as a function of distance;

(i) the muffler water spray acts as an efficient noise absorbent termination impedance for the test article, provided the terminal volume at the end of the test article is large;

(j) the high intensity ultrasonic noise content and the high acoustic frequency noise content produced by the noise generator of the present invention is absorbed by momentum exchange between the motion of the air and the mass of relatively stationary water mist contained in the muffler during operation; and (k) the muffler bulkhead holes and compartment volumes of the muffler filter the low frequency content of the noise.

Although the description above contains many specificities, there should not be construed as limitations on the scope of the invention, but rather as an exemplification of preferred embodiments thereof, with many other variations being possible. Accordingly, the scope of the invention should be determined not by the embodiments illustrated, but by the appended claims and their legal equivalents.

What is claimed as new is:

1. Apparatus for generating acoustical noise for testing purposes comprising:

a. a source of compressible fluid under elevated pressure in excess of 200 p.s.i.g.;

b. an expansion nozzle coupled to said fluid source and having a flow output axis for directing the flow of fluid in the axial direction;

c. a resonance tube axially aligned with said nozzle and adapted to receive substantially all of the expanding fluid emerging from said nozzle;

d. a first outer containment chamber enclosing said nozzle and coaxial with said flow output axis;

e. a second, inner containment chamber, coaxial with said first chamber and surrounding the opening of said resonance tube, said opening being located in the space between said inner and outer containment chambers; and f. means for mounting an article to be tested adjacent said second chamber but within said first chamber, whereby acoustic noise generated by said nozzle and said resonance tube is propagated between said inner and outer chambers to challenge test articles located within said outer chamber.

2. The apparatus of claim 1, above wherein the diameter of said resonance tube is substantially equal to the diameter of the exiting fluid stream from said nozzle.

3. The apparatus of claim 1, above wherein the fluid exiting said nozzle creates a Mach disk intermediate said nozzle and said resonance tube for redirecting fluid and resultant noise emerging from said resonance tube into the area between said containment chambers.

4. The apparatus of claim 2, above wherein the diameter of said resonance tube is substantially equal to the diameter of the Mach disk.

5. The apparatus of claim 1 above, further including a second expansion nozzle and a second resonance tube coaxially aligned with said second nozzle, said second nozzle and resonance tube contributing additional noise energy to the area between said containment chambers.

6. The apparatus of claim 5 above, further including a third expansion nozzle and a third resonance tube coaxially aligned with said third nozzle, said third nozzle and resonance tube contributing additional noise energy to the area between said containment chambers.

7. The apparatus of claim 6 above, further including a fourth expansion nozzle and a fourth resonance tube coaxially aligned with said fourth nozzle, said fourth nozzle and resonance tube contributing additional noise energy to the area between said containment chambers.

8. The apparatus of claim 1, above, further including a noise muffling assembly attached to said outer containment chamber for receiving and attenuating applied noise energy.

9. The apparatus of claim 8, above, wherein said noise muffling assembly includes means for adding moisture to the interior of said noise muffling assembly to absorb applied noise energy.

10. The apparatus of claim 9, above, wherein said means for adding moisture to the interior of said noise muffling assembly include a plurality of spray nozzles arranged around the interior of said noise muffling assembly, said spray nozzles adapted to be connected to a source of liquid.

11. A method of generating acoustical noise at levels sufficient for testing structures, comprising the steps of:

a. Releasing compressed fluid under pressures greater than 200 p.s.i.g. through an expansion nozzle along a principal flow axis;
b. providing a resonance tube axially aligned with said flow axis, said tube having a first diameter;
c. forming a Mach disk about said axis between said expansion nozzle and said resonance tube, said Mach disk having a diameter approximating said first diameter;
d. forming a compression shock wave in said resonance tube and propagating said wave back and forth in said tube;
e. forming an expansion shock wave in said resonance tube and propagating said expansion wave back and forth in said tube;
f. generating acoustical noise from the alternating compression and expansion shock waves in said resonance tube;
g. alternately creating a static shock wave at the mouth of said tube and an oscillating conical shock wave intermediate the location of said static shock wave and said Mach disk, said oscillating conical shock wave deflecting released fluid and reflected fluid radially and in the direction of the released fluid for generating additional acoustical noise;
h. directing the noise thus generated into a volume created by concentric shells whose longitudinal axis is coaxial with said fluid flow axis, whereby a test body positioned within the concentric shells in the path of said generated noise is challenged by said noise for testing purposes.

12. The method of claim 11 above further including the step of attenuating the generated noise in a muffler chamber attached to the concentric shells.

13. The method of claim 12, above further including the step of adding a fluid spray to the muffler chamber to absorb generated noise.

* * * * *